Oct. 29, 1957 R. S. BLOUGH 2,811,622
METHOD AND APPARATUS FOR SHAPING CYLINDRICAL
ARTICLES OF VARYING DIAMETERS
Filed Oct. 2, 1953 2 Sheets-Sheet 1

Inventor
RONALD S. BLOUGH
by: Carlson, Pitzner, Hubbard & Wolfe
Attys.

Oct. 29, 1957 R. S. BLOUGH 2,811,622
METHOD AND APPARATUS FOR SHAPING CYLINDRICAL
ARTICLES OF VARYING DIAMETERS
Filed Oct. 2, 1953 2 Sheets-Sheet 2
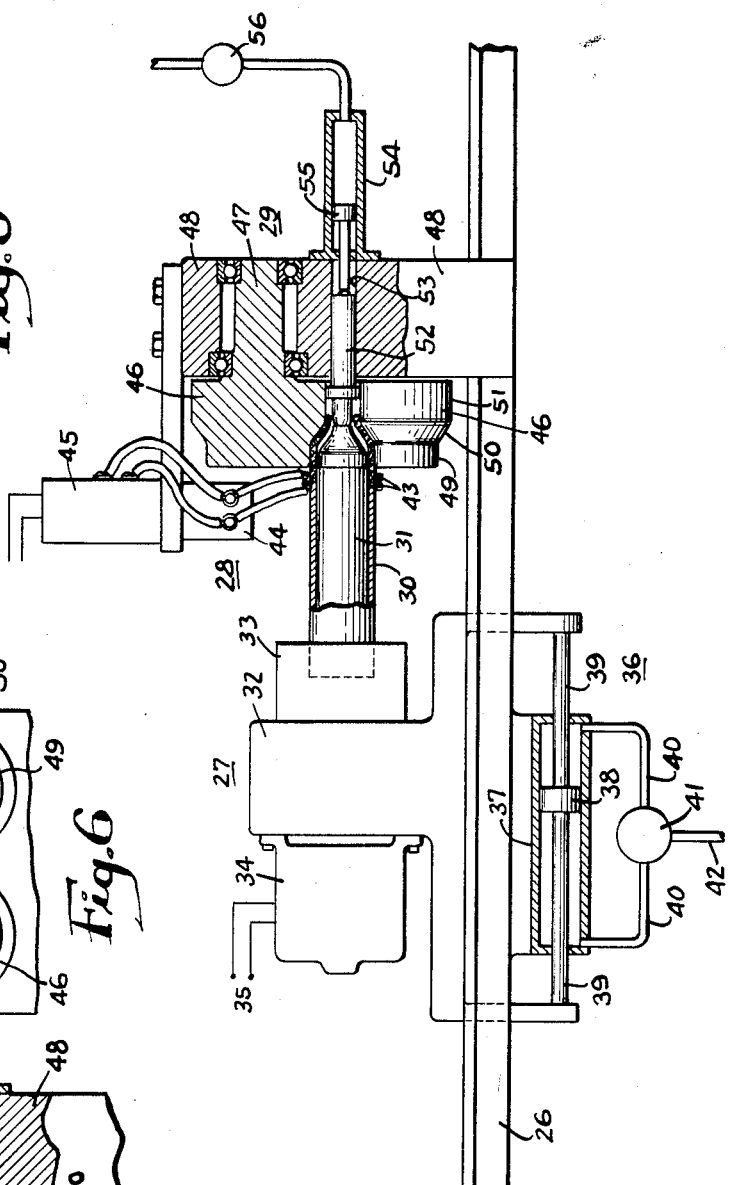
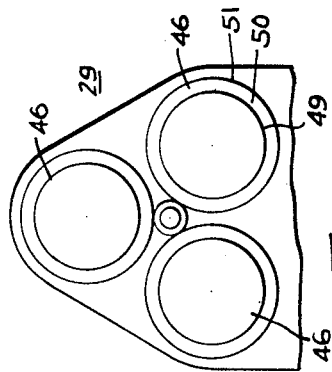
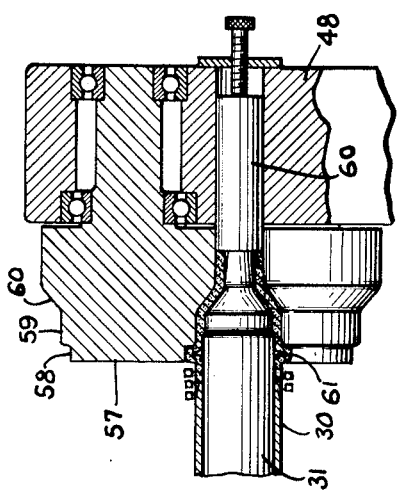
Inventor
RONALD S. BLOUGH
by: Carlson, Pitzner, Hubbard, & Wolfe
Attys.

United States Patent Office 2,811,622
Patented Oct. 29, 1957

2,811,622

METHOD AND APPARATUS FOR SHAPING CYLINDRICAL ARTICLES OF VARYING DIAMETERS

Ronald S. Blough, Fairfield, Iowa

Application October 2, 1953, Serial No. 383,902

15 Claims. (Cl. 219—7.5)

This invention pertains to the shaping of tubular metal stock having forging characteristics for the production of articles of various shapes. In a more specific aspect, the invention is concerned with the production of articles having different lengthwise portions varying substantially in diameter such, for example, as rocket shell bodies having a nose of a diameter considerably smaller than the body proper and internally shaped to provide a passage therethrough.

A general purpose of my invention is to increase the rate of production of such articles and lower their cost of manufacture. More particularly stated, it is an object of the invention to provide both a method and apparatus for the production from cylindrical tubular stock of articles of varying diameter or contours in one continuous operation in which successive portions of the stock are heated and shaped in rapid progression.

In accordance with one aspect of my invention, a new method of manufacture is provided for achieving the foregoing object in which rotational and axial feeding movements are imparted to the stock relative to successive heating and shaping zones, respectively. The stock is rapidly heated to at least forging temperature from its outer surface to a partial depth as it progresses through the heating zone so as to maintain a remaining core of relatively cold metal sufficient to sustain heavy feeding pressures which must be applied to the stock to advance it relative to the shaping zone. In the shaping zone, a forming tool is interposed in the path of the stock to effect the desired changes in diameter. In a particular method embodying my invention, the stock is supported or confined in an intermediate zone between the heating and shaping zones where the temperature of the heated stock may equalize. Such a method is especially advantageous for shaping both the inner and outer contours of cylindrical tubing between inner and outer forming tools.

In accordance with another aspect of my invention, apparatus for achieving the foregoing object is also provided in which an induction heater creates a field for rapidly heating a narrow band of the stock, and a set of forming rolls equidistantly spaced from each other and the path of the stock define both supporting and shaping surfaces for the heated stock. The forming rolls are provided with a first section closely adjacent the conduction heating means dimensioned to confine and support the heated stock while its temperature equalizes without materially deforming it and a second section of greater diameter to thereby shape the stock to the desired form. In a particular apparatus, hollow cylindrical stock is shaped between three outer free-turning shaping rolls as described and a shaped mandrel, which mandrel is arranged to be rotated and fed with the stock thereon through an induction heating field and under the supporting and shaping rolls.

Further objects and advantages will become apparent from the following description, taken in connection with the accompanying drawings, in which:

Figures 1, 2, and 3 illustrate successive steps of a method incorporating my invention for shaping a rocket shell body from a cylindrical tube having forging characteristics;

Fig. 5 is a side view, partly in section, of apparatus incorporating my invention for making a rocket shell body from tubular cylindrical metal stock;

Fig. 6 is a cross sectional view of the apparatus of Fig. 5 showing the position of the three forming rolls with respect to the axis of the tubular stock; and Fig. 7 is a fragmentary longitudinal sectional view of a modified apparatus somewhat schematic in its representation, particularly illustrating rolls for forming a flange extending beyond the original stock diameter.

Figure 1:
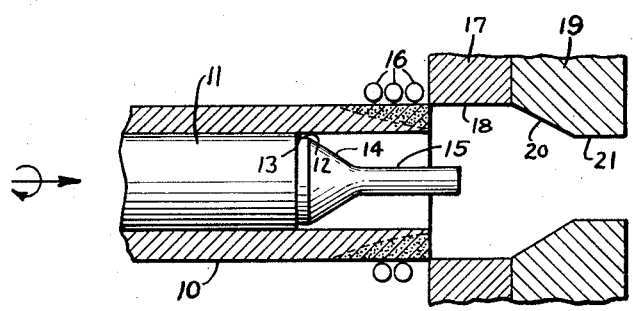

While the invention is susceptible of various modifications and alternative constructions, there is shown in the drawings, and will herein be described in detail, preferred embodiments thereof. It is to be understood that it is not thereby intended to limit the idea to the form disclosed, but it is intended to cover all such modifications and alternative constructions falling within the true spirit and scope of the invention as expressed in the appended claims.

Figure 2:
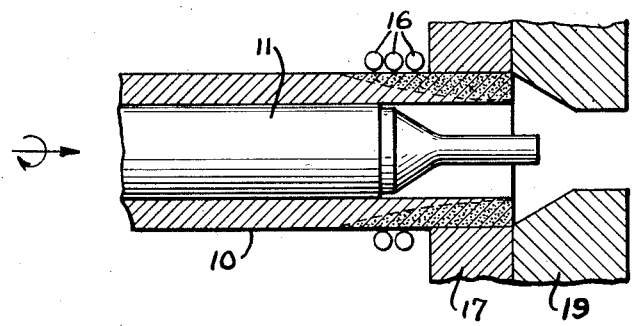
Figure 3:
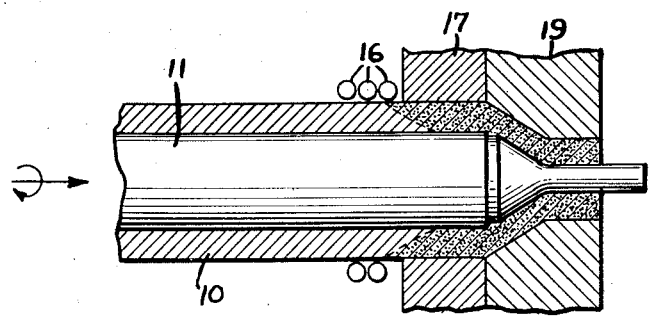

In accordance with the method aspects of my invention as illustrated in Figs. 1, 2, and 3, a length of tubular cylindrical stock 10 is advanced at a uniform rate, first through a heating zone, then through an equalizing and supporting or confining zone, and finally into a shaping zone to shape both the internal and external diameters of an end portion of the stock to the desired contours. Relative movement between the stock and the three zones is preferably accomplished by both rotating the stock and imparting an endwise movement to it so that succeeding portions of the stock travel through the zones in the order named along an axial path. It is to be understood that the movements, in the broader sense, are relative and that the zones in which the steps of the method are performed may progress along an axially fixed stock, and that further, the operation performing means in the different zones may rotate about the stock so long as the relative movement is produced. For the purpose of clarity and directness in describing the method aspects of my invention, however, the description is in terms of the preferred relation of the movements first mentioned.

In making the rocket shell casings from a uniform metal tubular cylinder 10, it is desired to provide particular contours for both the outer and inner surfaces of an end portion of the tubing so that the completed casing has varying thicknesses along its length. Accordingly, the cylindrical stock is mounted or fitted on a mandrel or arbor 11, suitably made of a solid steel cylinder having a reduced diameter end portion shaped to correspond to the desired inner contour of the rocket shell. Since the rocket shell has a uniform elongated cylindrical body, only the formed leading end portions and small adjoining portions of the cylindrical lengths are shown in Figs. 1 to 3 for both the stock 10 and the mandrel 11.

Referring now to the configuration of the mandrel 11 for a better appreciation of the advantages and capabilities of my method for rapidly forming cylindrical stock to meet particular design requirements, it may be seen that the mandrel 11 has a first step or cylindrical surface of slightly decreased diameter 12, thus providing a shoulder 13 between the step 12 and the full diameter. At the other end of the step 12, the mandrel diameter substantially decreases, in this particularly case, at an angle of approximately 40° to provide a somewhat rounded sloping shoulder 14 from which a slightly tapered end portion or spindle 15 extends. With such a mandrel, corresponding shoulders and contours may thus be impressed in the inner surface of the tubular stock in cooperation with the external shaping means.

The mandrel 11 rotates with the stock 10 and both are fed or advanced axially, the mandrel preferably being movable axially with respect to the stock only to mount or remove the stock. Since the mandrel is ordinarily stationary with respect to the tubular stock, the inner contour of the stock during shaping also depends upon the rate of feed, the shape of the external forming tools, and the heating pattern of the stock, as will become more apparent in the following paragraphs.

In heating zone, a short length of steel stock is quickly heated while progressing through the zone at the relatively fast feed rates desired for high production, the heating means in Figs. 1, 2 and 3 being indicated as an induction heating coil 16 which is restricted in width and diameter to surround a narrow band of the advancing stock 10 and provide an induction field through the length of the heating zone.

The heating process is necessary to raise the stock metal to a forging temperature where it is soft enough to be readily worked but is not at so high a temperature that it ruptures upon application of large deforming pressures. The large radial pressures required for substantial deformation of the stock also require a correspondingly large feed thrust, and as a result the stock in the heating zone is subject to rupture or upsetting if it is softened all the way through its thickness by excess heating. The radial or lateral shaping pressures may also tend to collapse or flute the stock in the heating zone if it is over softened since the reduced diameter position of the mandrel offers no radial support.

It is therefore important in the practice of the method of my invention that the heating rate be correlated with the feed rate to heat the tubular stock to a partial depth from its exterior surface to a temperature at least equal to the desired forging temperature and preferably above it, while at the same time leaving an inner core of relatively cold metal capable of sustaining the feed thrust. The induction heating method is preferably employed since its depth of penetration or application of the induced eddy currents causing the heating is capable of a large degree of control. Thus, given a portion of a particular stock 10 under the induction field, the depth of application or penetration of the field depends both upon the frequency of the induction field and the temperature to which the stock is already heated, the temperature being significant because it both affects its conductivity and (where the stock is a magnetic material) its permeability. For a given supply frequency, therefore, the heating of the stock at relatively cold entrance temperature is restricted to a small depth near the surface of the stock. The resulting increase in temperature, however, has the effect of increasing the depth of application of fields subsequent in time. Accordingly, as a portion of the stock already heated progresses through the induction field, the stock is heated to a progressively larger radial depth. Due to the relatively large stock feed rate or velocity of progression through the induction field, the temperatures do not have time to equalize by conduction throughout the thickness of the stock and hence an inner annular core of relatively cold metal remains which prevents the stock from being deformed in the heating zone.

In Fig. 1 the end of the stock is shown at a point where it has traveled through the heating zone and been heated to a high desired initial temperature to a substantial depth, which in this case is shown as most of the thickness of the tubing wall. The dotted portion of the tubing section in Fig. 1, and also Figs. 2 and 3, indicates that depth of the tubing heated to the high initial temperature, and its boundary is defined by the maximum temperature gradients marking large radial transitions in temperature, and thus in strength, of the stock. Under these conditions, therefore, the core of relatively cold metal remaining in the heating zone has its thickness extending all the way to the outer diameter of the stock at the beginning of the heating zone and decreasing gradually towards the inner diameter of the stock along a locus of points representing the maximum temperature gradient, leaving a partial thickness of relatively cold metal at the end of the heating zone. This core of cold metal extending through the heating zone may be considered as cone-shaped, truncated, of course, at the end of the heating zone. The large temperature gradient characterizing the heat pattern for a particular portion of the stock in the heating zone is an instantaneous one, and high heating energy and high feed rates relative to the heating zone length are required to maintain the cone-shaped temperature pattern as the stock progresses through the heating zone.

In the next step of my method, the heated portion of the stock having the supporting core of relatively cold metal is advanced through an equalizing and supporting or confining zone where it is externally supported or confined. Since this last mentioned zone is not heated except to a small extent by reason of its proximity to the heating zone, the temperature tends to equalize by conduction throughout the thickness, that is, along the radial dimension, of the stock 10. As shown in Fig. 2, where the stock is advanced to the end of the equalizing and supporting or confining zone, the entire thickness of the tubing wall within said zone is equalized to a forging temperature somewhat below the initial temperature to which portions of the stock were heated. The desired equalizing time for bringing both the interior and the exterior surfaces of the stock to the desired forging temperature is obtained by correlating the length of the equalizing zone with the feed rate of the stock. For supporting the stock to prevent it from undue strain, and also to some extent to control the temperature equalization, a bearing member 17 having a supporting surface 18 parallel to the axis of the stock, and spaced therefrom by a distance substantially equal to the stock diameter, is shown for this purpose. Various means for providing this support may be employed and it may be defined, for example, by the line or area of contact extending the length of the equalizing and supporting or confining zone of a plurality of rollers or needle bearings disposed about the stock, or by a plurality of spaced stationary die or guide surfaces. The confining surface 18 does not appreciably work or form the heated metal except insofar as it tends to maintain the original stock dimension, but it does support the stock at forging temperature immediately prior to the shaping operation where its diameter is materially altered.

Thus, in the equalizing and supporting or confining zone, the inner surface of the stock attains the desired forging temperature by conduction in order that the mandrel may be fully effective in helping to produce the finished inner contour of the tubing. At the same time, the supporting surface 18 tends to a certain degree to cool the exterior surfaces it contacts, thus shortening the equalizing time required for bringing the exterior surfaces from their usually high or initial temperature to the desired forging temperature. The amount of conduction is controlled by the mass and thermal conductivity of the material associated with the supporting surfaces 18 and is preferably adjusted so that both the inner and outer surfaces of the tubing have attained their desired forging or working temperatures at the end of the equalizing and supporting zone. The degree of equalization is not absolute, but it is necessary that the cold core be heated to forging temperature in the equalizing process.

The shaping operation proper begins in the shaping zone where forming tool 19 having a shaping surface is interposed in the path of the advancing heated stock. The shaping surface may be defined by the line or area of contact of a roll or number of rolls, or by a stationary die or other form of shaping tool having portions extending into the path of the advancing stock to deform it by lateral or radial pressure. The particular forming or shaping surface shown in Figs. 1 to 3 has an initial oblique portion 20 near the beginning of the equalizing and supporting or confining zone which is at an average angle with respect to the stock path or axis of approximately 40°, for substantially reducing the stock diameter and a subsequent portion 21 more nearly parallel with the stock axis. The greater the angle of the forming surface with respect to the stock axis, the greater is the required axial thrust or feed pressure, and hence the more carefully the heating must be governed.

In Fig. 3 the stock is shown reduced to the finished dimensions required when the stock has reached the end of the forming surface. Accordingly, the heating in the heating zone is stopped by turning off the induction heating current after the last portion of the stock to be formed by the shaping tool has been heated. It should also be noted that with the shaped mandrel such as that shown at 11, practically all of the tubular stock which is to be shaped is initially spaced from the mandrel, thus preventing too rapid conduction of heat away from the interior surface of the stock. In this way, despite the application of heat only from the outside of the stock, the temperature can be readily equalized to provide the desired working temperatures for both the inner and outer surfaces of the stock. When the forming operation is completed, the workpiece or the tools are both withdrawn leaving a shaped article requiring little or no finish tooling.

Figure 4:
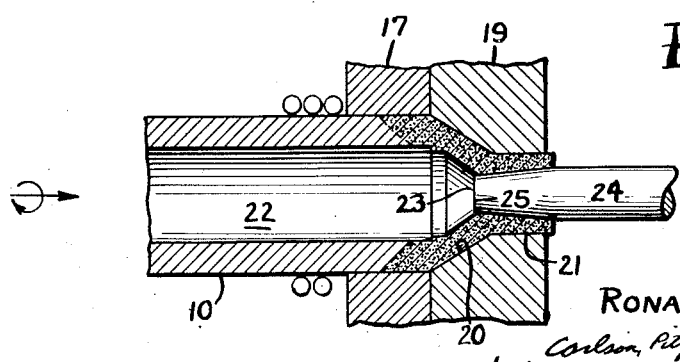
Fig. 4 illustrates another aspect of the method of Figs. 1, 2, and 3.

While the mandrel 11 in effect acts as a shaping tool, since it controls the contour of the heated stock material pressed against it, pressure may also be applied against the inner heated surface of the stock in other ways to control the inner stock contour and tubing wall thickness. Thus, in Fig. 4, which again shows a section of tubular stock 10 being formed as a rocket shell body, a mandrel 22 is mounted within the tubing, but has a small diameter end portion 23 terminating a distance within the end of the stock section 10. A second mandrel 24 is inserted from the open end of the stock tubing for a sufficient distance so that its restricted diameter end portion 25 engages the opposing end surface 23 of the other mandrel. The mandrel 24 is preferably driven so as to rotate with the first mandrel 22 and is axially advanced into the portion 21 through the open outer end thereof until its restricted diameter end 25 engages the opposing end surface 23 of mandrel 22. Hence, mandrel 24 acts as a forming tool in exerting an outward reaction against the inner wall of the tubular stock 10. A particular advantage, such as indicated by the specific arrangement of mandrels 23 and 25 in Fig. 4, is the greater range of inner contour and tubing thicknesses that may be formed. As shown in Fig. 4, the inner tubing diameter has a minimum value in the regions near the junction of the mandrels 22 and 24, but both mandrels can be easily withdrawn from the formed rocket shell without damaging either the shell or the mandrels. It is not necessary, of course, that the inner forming tool 24 take the form of a mandrel, since it may, depending upon the particular application, take the form of a number of shaping dies or relatively small diameter shaping rolls. The advantages previously discussed relative to the control of the inner tubing wall temperature, without the necessity of applying the heat directly to the inner wall, are likewise applicable in this aspect of my shaping method.

In a broader aspect the method of my invention may also be described in terms of the operations of the first and third zones only, namely, the rapid heating of the advancing stock in the first zone correlated with the feed rate to leave a relatively cold core or cone of material capable of sustaining the thrust and the subsequent shaping of the heated stock as it advances against a shaping tool surface interposed in the stock path. Such a method is not limited to the temperature equalizing and confining and supporting operation and it is sometimes applicable where the required shaping is slight, the acceptable forging temperature range is very large, or the inner tube contour requirements are not critical and the inner surface need not be at a particular forging temperature for shaping by a mandrel.

It should also be pointed out that the zones in which the respective operations are performed are each coextensive with the length of stock acted upon and that the zones are directly adjacent each other. The respective surfaces for use in performing the supporting or confining function or operation and for performing the forming operation may also be contiguous or integral. It is obvious, of course, that different means may be employed in performing the operations described, but the method of practicing my invention is not restricted to a particular construction.

One particular apparatus, which as such incorporates my invention, is further described in the following paragraphs relating to Figs. 4 and 5, and reference is also made thereto for a further understanding and appreciation of the method of my invention as practiced therewith. As shown, the operating mechanism of the apparatus is positioned relative to a suitable bed or set of ways 26, similar to that of a lathe, and includes as major assemblies a feed carriage 27, an induction heater 28, and a set of shaping rolls 29. Shown in process of being formed in the machine is a section of tubular steel stock 30 mounted over a formed mandrel 31, corresponding to the stock 10 and mandrel 11 previously discussed.

The feed carriage 27 has a body portion 32 fitted over the ways 26 and slidable along them to provide the axial feeding movement to the stock. A chuck 33 on the side of the stock facing the heater and rolls is provided to firmly grip the stock section and is suitably rotated by a geared motor 34 which is mounted on the other side of the carriage and energized through flexible leads from a current source 35. The voltage or frequency of the source 35 may be varied to control motor speed but the rotary drive is normally set at a uniform speed during the shaping operation for any particular stock size.

In order to feed the stock axially along the ways a hydraulic actuator 36 is employed to advance and retract the feed carriage 27. As shown in Fig. 5, this actuator suitably takes the form of a double-acting cylinder 37 which is firmly anchored or fixed to the machine bed 26. The position of a piston 38 within the cylinder governs the feed carriage position, axial shafts 39 extending from the piston through opposite ends of the cylinder 37 being fixed at their ends to the feed carriage for that purpose. The differential pressure of a hydraulic fluid introduced to opposite sides of the piston by hydraulic conduits 40 governs the piston position. The advance and retraction of the feed cylinder during each operation is thus easily governed by a differential control valve 41 to which the conduits 40 are connected and which is provided with hydraulic fluid under sufficient pressure by a supply conduit 42. Alternative conventional means of carriage feed which can provide both fairly rapid feed rates as well as the high thrust required to advance the stock against a deforming tool, may be substituted as desired.

The rapid heating of the stock which at the same time leaves a core of relatively cold metal in the tubular stock for sustaining the axial thrust is facilitated in the induction heater 28 by the use of an induction heater coil 43 having a short axial length, and in this case is defined by two turns of a hollow conductor adapted to be cooled by the passage of water or other coolant therethrough. The coil 43 is mounted so as to be concentric with a short length of the tubular stock 30 when it is fed axially along the ways and also fairly closely surrounds the stock so that the axial length of the field is restricted. To provide substantially continuous coupling the coil conductor is rectangular in cross section, thus permitting close spacing of the turns and uniform spacing between the facing surfaces of the stock and the conductor along the length of the heating zone. Because of the rigidity of the conductor the coil is easily self supported, its ends being fixed to a terminal board 44. A source 45 of high power, high frequency energy is connected to the terminal board 44 so that a high frequency field is established through the coil for inducing currents in conductors within the field of the coil and thereby heating them.

An example of the heating requirements involved in the successful production of rocket shells with the apparatus of Fig. 5 serves to illustrate the requirements involved. The rocket shells are made from cylindrical tubing sections approximately eight inches long, and having a two-inch diameter with 5/32-inch wall thickness, the material being an alloy steel containing chromium and molybdenum and generally specified and supplied as W. D. 4140. The rotational speed of the stock is not critical, 90 revolutions per minute being satisfactory. In order to heat the stock to approximately 2100° F. which is approximately the temperature required for efficient forming in this particular case, the amount of energy required to produce the approximate 2000° F. temperature rise is very large and can be shown to be, with steel of these dimensions, .95 B. t. u. per second per inch length of stock. This is equivalent to electrical energy of 100 kilowatts per inch of tubing per second in the coil 43. Thus, it may be seen that with a feed rate of 18 inches per minute, which is approximately one-third of an inch per second, some 30 kilowatts of electrical energy in the coil are required for an effective coil length of one inch. Furthermore, the particular characteristics of induction heating are such that its effective penetration or depth of application decreases with the frequency of the energy supplied, but increases with the temperature already attained by the material being heated. This effect and the accompanying temperature gradient across the area of application are increased where, as here, a magnetic material is employed, since the depth of heating also increases with a decrease in the permeability of the steel. With field frequencies of ten kilocycles per second the initial penetration is only .05 inch below the surface, depending upon a hysteresis effect, and when the initially heated portion reaches a temperature in the neighborhood of 1400° F., eddy currents concentrated further below the surface provide the heating. Burning of the surface of the stock is thus avoided, and at the same time the heat rate can be made very high. Preferably, the heated portion of the stock, that is, as distinguished from the cold supporting core, has portions at temperatures in the vicinity of 2400° F. so that the temperature may equalize later to a value near 2100° F. for forging. The temperature drop across the area of application of the heating energy is believed to be in the vicinity of 1000° F. in 1/32 inch, under the conditions described, with the result that the cold core sustains the feeding thrust on the stock.

In the forming roll assembly 29 three free-running rolls 46 are positioned with their axes substantially parallel to the feed or stock axis and equidistantly spaced therefrom and from each other, as particularly shown in Fig. 6. The rolls themselves are made of solid steel and rotate by reason of the traction of their engaging surfaces with the rotating tubular stock 30 as it advances under the rolls. Each roll is provided with a shaft 47 extending towards the rear of the machine bed 26 away from the heater, the shafts being adequately journaled to permit free rolling and to prevent end play in a fixed housing 48. The rolls and shaft housing are relatively massive so that they may withstand the large axial and radial pressures involved in the shaping operations. They are not relied upon for heating of the stock, that operation being performed directly in the stock by the induction heater 28. Cooling means for the rolls are not shown, but the rolls can be suitably cooled by a water spray between manufacture of successive articles.

As may be seen in Fig. 5 each roll 46 has a first section 49 of the diameter just sufficient to engage the tubular stock over a short length immediately following the heating zone. This cylindrical portion 49 serves an important function in that, considering the action of the corresponding surfaces on all three rolls, it confines and supports the heated portion of the stock just after it has emerged from under the induction coil 43. Described in another way, the cylinder of tangency of this portion of the rolls has substantially the same diameter as the other diameter of the stock. Accordingly, then, during the time any heated portion of the stock is fed along the axial length of the cylindrical surfaces 49 its temperature is allowed to equalize through the tubing thickness. The second section of each roll has a length 50 of substantially increasing diameter to form, in this particular case, a surface having an angle of approximately 40 degrees with the roll axis. Because of its greater diameter, the surfaces 50 extend into the path of the heated stock and force the tubing wall inward against the formed end of the mandrel 31. The forming action is progressive, of course, each portion of the heated stock under a roll surface 50 being forced progressively inward as it is fed into the rolls. A third section 51 of each roll having a substantially uniform diameter equal to the maximum diameter of the second section 50 provides the finished surface on the reduced end diameter portion of the shell. This section 51 may also increase slightly in diameter toward the rear of the roll, that is, in the direction away from the heater, to provide a taper on the rolls.

Various other shapes may be employed for forming the section 50 of each roll, which section does essentially all of the work on the material being formed. The last section 51 may also vary somewhat in diameter or may be omitted, depending upon the contour of the particular article to be shaped. In cases where the stock is to be withdrawn axially after the forming operation, it is necessary that no intermediate diameter of the rolls be so large as to define a minimum circle of tangency smaller than in a following portion of the roll. This limitation, however, may be overcome by providing means for moving the rolls radially away from the stock axis upon completion of the shaping process, although varying the spacing of the rolls from the stock is not depended upon for producing variations in the stock contour. While the restriction of the rolls to three in number permits the largest possible diameter rolls and thus the largest area of shaping surface contact without risk of misalinement or axial deflection of the stock, a larger number of small diameter rolls may be employed.

As further shown in Fig. 5 a second mandrel 52 is also employed as an internal shaping tool. In this case, the second mandrel slides as a piston within an axial bore 53 through the roll housing 48. An air cylinder 54 secured to the back of the housing 48 and alined with the bore 53 has a piston 55 for advancing the mandrel 52. A conduit for compressed air or other compressible fluid supplies the fluid to the air cylinder 54, the pressure being regulated or controlled by a valve 56 in the supply line. The pneumatic pressure behind the mandrel 52 thus forces it forward toward the mandrel 31 so that their ends engage. A special utility of the second mandrel 52 arises from the fact that it can be withdrawn from the opposite end of the tubular stock from which the mandrel 31 must be withdrawn and hence can be employed to provide a portion of reduced inner diameter of the stock. This is suitably accomplished by providing reduced diameter end portions on the opposing or facing ends of the two mandrels. As the mandrel 31 advances the mandrel 52 is forced back against the compressible fluid, its terminal position still leaving the end of the mandrel 52 within the end of the stock section, however.

For the operation of the apparatus illustrated in Figs. 5 and 6 automatic controls may be suitably employed for advancing the stock and mandrel a given distance and then retracting it, and for energizing the heating coil only during the time that portions of the stock to be subsequently formed are being fed through it. After each rocket shell casing has been withdrawn from the forming roll, the chuck 33 is loosened, the stock and mandrel removed, and the mandrel driven out of the finished rocket shell. Another stock section tightly mounted over a mandrel is then inserted in the chuck and the shaping process repeated.

A modification of this apparatus is shown in Fig. 7 in which forming rolls 57 are employed which correspond to the forming rolls 46 of Figs. 5 and 6 except that an initial small diameter step 58 precedes the supporting surfaces 59 and the forming surface 60 corresponding to the surfaces 49 and 50 of the rolls 46. The cylinder of tangency of the reduced diameter portion 58 is therefore larger than the diameter of the stock being formed. Accordingly, after the completion of the shaping as previously described in which the roll surface 59 supports the heated portions of the stock without deforming them, the end of the stock is subjected to a reaction or reverse thrust such as provided by a positive stop suitably taking the form of a blocked piston 60 seated in the roll housing 48. The tendency, therefore, is for the stock to expand radially, and in view of the particular heat pattern created by the induction heating means previously described, the metal flows most readily in the area immediately preceding the heating coil which is that area under the cylinder of tangency defined by surface 58. The heating coil remains energized in this case long enough to have heated the flange-forming portion of the stock during its travel through the heating coil. Accordingly, the tube tends to radially expand at this point, the flange 61 so formed being restricted in diameter by the surface 58 of the roll. In this way an external flange is simply and easily provided without preventing axial withdrawal of the completed shaped article.

I claim as my invention:

1. The method of shaping cylindrical metal tubing having forging characteristics which comprises positioning the tubing on a mandrel having portions of diameter smaller than the inner diameter of said tubing, rotating the tubing and feeding it relative to an axial path, heating succesively presented portions of the tubing along a first section of the path to a forging temperature from the external surface to a radial depth sufficient to leave a remaining core of relatively cold metal capable of sustaining the feeding thrust, externally supporting the succesively presented heated portions of tubing along a second section of its path whereby the temperature of the heated tubing portions is at least partially equalized radially, and interposing a forming tool in a third section of the path to press the walls of the successively heated and supported tubing portions against said mandrel portions.

2. The method of shaping cylindrical tubular metal stock having forging characteristics which comprises rotating the stock and feeding it axially on a mandrel relative to successive heating, temperature equalizing, and shaping zones, and which includes heating to forging temperature successively presented portions of the stock to a depth increasing gradually from the external surface to a diameter near the internal diameter of the stock during the relative travel of each such portion through the heating zone to leave a remaining core of relatively cold metal capable of sustaining the feeding thrust, externally supporting the succesively presented portions of the heated stock during its relative travel through the equalizing zone, and interposing a forming tool in the path of the stock in the shaping zone to control the tubular stock wall trickness and contour between said tool and said mandrel.

3. The method of shaping tubular metal stock having forging characteristics which comprises supporting at least a portion of the length of the stock upon a mandrel, rotating the tubing and mandrel and feeding them along an axial path, heating successively presented portions of the tubing along a portion of the path to a forging temperature from the external surface to a depth sufficient to leave a remaining core of relatively cold metal capable of sustaining the feeding thrust, externally confining the tubing in its axial path upon emergence from the heating zone, and interposing a forming tool in the path of each such successively presented heated tubing portion to shape the wall thickness and contour between the tool and the mandrel.

4. The method of shaping hollow cylindrical stock having forging characteristics which comprises positioning a shaped mandrel within said stock having an end portion of reduced diameter, rotating the stock and feeding it along an axial path through three successive zones and which includes heating successively presented portions of the stock above forging temperature to a partial depth from the external surface during the travel of each such portion through the first zone, externally supporting the successively presented portions of the heated stock during its travel through the second zone whereby the temperature of the portions is equalized at forging temperature, and applying radial pressure in the path of the successively presented portions of the heated stock in the third zone to press the walls of the stock against said end portion of said mandrel.

5. The method of shaping cylindrical tubular stock having forging characteristics, which comprises, feeding the stock axially through an annular heating zone defined by an electric induction heating coil, correlating the rate of feed with the length of the heating zone and the power and frequency of the applied electric energy so as to heat successively presented portions of the stock to a forging temperature at a rate increasing progressively from the external toward the internal surfaces of the tubular stock during the travel of each such portion through the heating zone, externally supporting the stock while allowing it to cool in an immediately following temperature equalizing zone, and interposing in the path of movement of the stock immediately upon emergence from the equalizing zone a deforming element for engagement by the stock.

6. The method of shaping cylindrical tubular stock having forging characteristics, which comprises, feeding the stock axially through an annular heating zone defined by an electric induction heating coil, correlating the rate of feed with the length of the heating zone and the power and frequency of the applied electric energy so as to heat successively presented portions of the stock to a forging temperature at a rate increasing progressively from the external toward the internal surfaces of the tubular stock during the travel of each such portion through the heating zone, externally supporting the stock while allowing it to cool in an immediately following temperature equalizing zone, and subjecting the stock immediately upon emergence from the equalizing zone to internal and external radial deforming pressures to change the internal and external contours of the tubing wall.

7. The method of shaping cylindrical tubular stock having forging characteristics, which comprises, feeding the stock axially through an annular heating zone defined by an electric induction heating coil, correlating the rate of feed with the length of the heating zone and the power and frequency of the applied electrical energy so as to heat successively presented portions of the stock to a forging temperature at a rate increasing progressively inward from the external surface towards the internal surface of the stock during the travel of each such portion through the heating zone, externally supporting the heated stock upon emergence from the heating zone in a temperature equalizing zone until the inner surface reaches forging temperature, and subsequently reducing the heated leading end portion of the stock to a diameter substantially less than that of the stock by external and internal deforming elements respectively acting upon the external and internal surfaces of the stock.

8. The method of shaping cylindrical tubular stock having forging characteristics, which comprises supporting the stock on a mandrel with a shaped end portion having diameters susbtantially less than that of the stock inner diameter, feeding the stock axially at a uniform rate through an annular heating zone defined by an electric induction heating coil, correlating the rate of feed with the length of the heating zone and the power and frequency of the applied electrical energy so as to heat successively presented portions of the stock to a temperature exceeding forging temperature to a partial depth, increasing progressively from the external surface towards the internal surface of the stock during the travel of each such portion through the heating zone, externally supporting the stock in an immediately following temperature equalizing zone having a length correlated to the feed rate for the internal surface of the stock to reach forging temperature, and subsequently reducing the heated leading end portion of the stock to a diameter substantially less than that of the stock by applying a radially inward pressure to the stock as it emerges from the equalizing zone to cause the stock material to flow inwardly against the surface of the mandrel end portion.

9. The method of shaping cylindrical tubular stock having forging characteristics, which comprises supporting the stock on a mandrel with a shaped end portion having diameters substantially less than that of the stock inner diameter, feeding the stock axially at a uniform rate through an annular heating zone defined by an electric induction heating coil, correlating the rate of feed with the length of the heating zone and the power and frequency of the applied electrical energy so as to heat successively presented portions of the stock to a temperature exceeding forging temperature to a partial depth increasing progressively inward from the external surface towards the internal surface of the stock during the travel of each such portion through the heating zone, externally supporting the stock in an immediately following temperature equalizing zone having a length correlated to the feed rate for the internal surface of the stock to reach forging temperature, and subsequently reducing the heated leading end portion of the stock to a diameter substantially less than that of the stock by interposing in the path of movement of the heated stock a series of shaping rolls engageable with the external surface of the stock to cause the stock material to flow inwardly against the surface of the mandrel end portion.

10. Apparatus for shaping tubular metal stock of a given diameter which comprises a plurality of free running forming rolls equidistantly spaced from each other and from a central axis and with the axis of each roll substantially parallel to said central axis, each of said rolls having a stock-confining section of uniform diameter for a length along said central axis which defines a cylinder of tangency of substantially the same diameter as that of said stock and a stock-reducing section adjacent said confining section having a diameter increasing from said first diameter to a larger second diameter which defines circles of tangency which are smaller than said stock diameter, an induction heating coil axially spaced from said set of rolls positioned around said central axis and adjacent the stock-confining sections of said rolls, and means for rotating a stock section and feeding it along said central axis relative to said heating coil and between said forming rolls.

11. Apparatus for shaping tubular metal stock of a given diameter which comprises a plurality of free-running forming rolls equidistantly spaced from each other and from a central axis and with the axis of each roll substantially parallel to said central axis, each of said rolls having a stock-enlarging section having diameters for a length along said central axis which define circles of tangency greater than the diameter of said stock, an intermediate stock-confining section having a cylinder of tangency of substantially the same diameter as that of said stock, and a stock-reducing section having a diameter increasing from said first diameter to a larger second diameter which defines circles of tangency which are smaller than said stock diameter, an induction heating coil axially spaced from said set of rolls positioned around said central axis and adjacent the stock-enlarging sections of said rolls, and means for rotating a stock section and feeding it along said central axis relative to said heating coil and between said forming rolls.

12. Apparatus for shaping tubular metal stock having forging characteristics which comprises means for rotating and axially feeding a stock section at a uniform rate along a given path, an induction heating coil for producing an induction heating field along a length of said path, means for energizing said coil at a high power with a frequency high enough to heat the stock to forging temperature from the external surface to a partial depth at the given feed rate whereby a core of relatively cold metal remains along said length for sustaining the feed thrust, and a plurality of free running forming rolls adjacent said heating coil equally spaced from said path and from each other and positioned with their axes substantially parallel to said path for progressively shaping the stock fed between the rolls, said rolls each having a first section nearest said heating coil with a diameter defining a cylinder of tangency of the same diameter as the stock for supporting the heated stock and having a second portion of gradually increasing diameter for reducing the stock diameter.

13. Apparatus for shaping tubular metal stock having forging characteristics which comprises means for rotating and axial feeding a stock section at a uniform rate along a given path, an induction heating coil for producing an induction heating field along a length of said path, means for energizing said coil at a high power with a frequency high enough to heat the stock to forging temperature from the external surface to a partial depth at the given feed rate whereby a core of relatively cold metal remains along said length for sustaining the feed thrust, and three free running forming rolls adjacent said heating coil equally spaced from said path and from each other and positioned with their axes substantially parallel to said path for progressively shaping the stock fed between the rolls, said rolls each having a first section nearest said heating coil with a diameter defining a cylinder of tangency of the same diameter as the stock for supporting the heated stock and having a second portion of gradually increasing diameter for reducing the stock diameter.

14. Apparatus for shaping the contour and thickness of the wall of tubular metal stock of a given diameter which comprises a plurality of free running external forming rolls equidistantly spaced from each other and from a central axis and with the axis of each roll substantially parallel to said central axis, a stock-confining section of each of said rolls having a uniform diameter for a length along said central axis which defines a cylinder of tangency of substantially the same diameter as that of said stock and a stock-reducing section of said rolls adjacent said first section having a diameter increasing from said first diameter to a larger second diameter which defines circles of tangency which are smaller than said stock diameter, an internal forming tool positioned between said rolls along said central axis, an induction heating coil axially spaced from said set of rolls positioned around said central axis and adjacent the stock-confining sections of said rolls, means for energizing said coil at a high frequency and high power, and means for rotating a stock section and feeding the leading end thereof axially through said heating coil and between said forming rolls and over said internal forming tool.

15. Apparatus for shaping tubular steel stock of a given diameter which comprises a plurality of free running forming rolls equidistantly spaced from each other and from a central axis and with the axis of each roll substantially parallel to said central axis, each of said rolls having a stock enlarging section having diameters for a length along said central axis which define circles of tangency greater than the diameter of said stock, an intermediate stock confining section having a cylinder of tangency of substantially the same diameter as that of said stock, and a stock-reducing section having a diameter increasing from said first diameter to a larger second diameter which defines circles of tangency which are smaller than said stock diameter, an induction heating coil axially spaced from said set of rolls positioned around said central axis and adjacent the stock-enlarging sections of said rolls, means for energizing said coil at a high frequency and high power, means for rotating a stock section and axially advancing the leading end along said central axis through said heating coil and between said forming rolls, and blocking means stationed between said rolls for applying a reverse thrust to said leading end of said advancing section for upsetting the stock under said enlarging sections of said rolls.

References Cited in the file of this patent

UNITED STATES PATENTS

| | | |
|---|---|---|
| Re. 23,092 | Berliner | Mar. 22, 1949 |
| 1,440,527 | Brinkman | Jan. 2, 1923 |
| 1,953,665 | Wallace | Apr. 3, 1934 |
| 2,325,480 | Crawford | July 27, 1943 |
| 2,331,324 | Jakosky | Oct. 12, 1943 |
| 2,444,259 | Jordan | June 29, 1948 |
| 2,452,974 | Westin | Nov. ?, 1948 |